(12) United States Patent
Ruggeri

(10) Patent No.: US 11,396,947 B2
(45) Date of Patent: Jul. 26, 2022

(54) FACE SEAL WITH WELDED BELLOWS

(71) Applicant: Eaton Intelligent Power Limited, Dublin (IE)

(72) Inventor: Ed N. Ruggeri, Westport, MA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/112,682

(22) Filed: Dec. 4, 2020

(65) Prior Publication Data
US 2021/0172528 A1 Jun. 10, 2021

Related U.S. Application Data

(60) Provisional application No. 62/944,056, filed on Dec. 5, 2019.

(51) Int. Cl.
*F16J 15/36* (2006.01)
*F16J 15/34* (2006.01)

(52) U.S. Cl.
CPC ......... *F16J 15/363* (2013.01); *F16J 15/3452* (2013.01)

(58) Field of Classification Search
CPC ........ F16J 15/3452; F16J 15/36; F16J 15/363; F16J 3/047
See application file for complete search history.

(56) References Cited

U.S. PATENT DOCUMENTS

| | | | |
|---|---|---|---|
| 1,366,879 A | 1/1921 | Dennedy | |
| 1,602,177 A | 10/1926 | Spreen | |
| 3,276,780 A | 10/1966 | Andresen et al. | |
| 3,288,474 A | 11/1966 | Gits | |
| 3,372,939 A | 3/1968 | Coulombe et al. | |
| 3,515,394 A | 6/1970 | Stevens | |
| 4,163,563 A | 8/1979 | Mullaney | |
| 4,365,816 A | 12/1982 | Johnson et al. | |
| 4,378,119 A * | 3/1983 | Luxford | F16J 15/363 277/389 |
| 4,453,722 A | 6/1984 | Swanson | |
| 5,011,166 A * | 4/1991 | Watts | F16J 3/047 277/379 |
| 5,823,539 A | 10/1998 | Rockwood | |
| 8,714,558 B2 | 5/2014 | Berard | |
| 9,447,885 B2 * | 9/2016 | Suefuji | F16J 15/363 |
| 9,482,158 B2 | 11/2016 | Ullah | |
| 9,581,248 B2 * | 2/2017 | Itadani | F16J 15/34 |
| 2003/0230851 A1 | 12/2003 | Roddis et al. | |
| 2012/0321450 A1 * | 12/2012 | Aschenbruck | F01D 11/005 415/174.2 |

(Continued)

FOREIGN PATENT DOCUMENTS

| | | |
|---|---|---|
| CN | 201027688 Y | 2/2008 |
| CN | 201297391 Y | 8/2009 |
| CN | 202955236 U | 5/2013 |

*Primary Examiner* — Nicholas L Foster
(74) *Attorney, Agent, or Firm* — Merchant & Gould P.C.

(57) ABSTRACT

A sealing arrangement is disclosed. In one example, the sealing arrangement includes a composite seal ring that includes a seal ring shell and a seal insert, an outer housing, at least one spring, and a welded bellows. The welded bellows can have a fixed end and an opposite free end. The fixed end can be welded to one of the seal ring shell and the outer housing, and the free end can make a non-welded contact seal with the other one of the seal ring shell and the outer housing.

21 Claims, 10 Drawing Sheets

(56) References Cited

U.S. PATENT DOCUMENTS

| | | |
|---|---|---|
| 2014/0265146 A1 | 9/2014 | Danaher |
| 2015/0211632 A1* | 7/2015 | Durack ............... F16H 61/6649 476/40 |
| 2015/0240950 A1* | 8/2015 | Takahashi ............ F16J 15/3452 277/377 |
| 2016/0281856 A1* | 9/2016 | Itadani .................... F16J 15/38 |

* cited by examiner

FACE SEAL WITH WELDED BELLOWS

CROSS-REFERENCE TO RELATED APPLICATION

This application claims the benefit of U.S. Patent Application Ser. No. 62/944,056, filed on Dec. 5, 2019, the disclosure of which is incorporated herein by reference in its entirety.

TECHNICAL FIELD

The present disclosure relates generally to sealing arrangements in high temperature environments. More specifically, the present disclosure relates to welded bellows and systems for sealing about a rotating component such as a shaft.

BACKGROUND

Mechanical face seals are widely used to provide sealing between a stationary housing, often containing a fluid such as oil, and a rotating shaft that passes through the housing. Typically, dynamic sealing (e.g., primary sealing) is provided by a sealing ring that does not rotate relative to the housing, and a mating ring that rotates with the rotating shaft. A welded bellows is used to provide axial loading of the dynamic sealing between the sealing ring and the mating ring. The welded bellows also provides static sealing (e.g., secondary sealing) that can accommodate axial movement between the shaft and the housing (e.g., caused by thermal expansion/contraction). Example face seals with welded bellows are disclosed by US 2014/0265146 and U.S. Pat. No. 8,714,558.

While welded bellows seals are effective, improvements in this area are still needed.

SUMMARY

One aspect of the present disclosure relates to a sealing arrangement. The sealing arrangement can include a composite seal ring with a seal ring shell that has a first end and an opposite second end. The composite seal ring can also include a seal insert that is adapted to be mounted at the first end of the seal ring shell. The sealing arrangement can include an outer housing positioned at the second end of the seal ring shell. The seal ring shell and the outer housing can be telescopically movable with respect to each other along a central axis such that relative axial sliding movement is permitted between the seal ring shell and the outer housing. The sealing arrangement can include at least one spring axially compressed between the seal ring shell and the outer housing for biasing the seal ring shell and the outer housing axially away from one another. The sealing arrangement can further include a welded bellows axially compressed between the seal ring shell and the outer housing. The welded bellows can have a fixed end and an opposite free end. The fixed end can be welded to the seal ring shell or the outer housing, and the opposite free end can make a non-welded contact seal with the other one of the seal ring shell or the outer housing.

Another aspect of the present disclosure relates to a sealing arrangement for sealing between a rotatable shaft and a casing through which the rotatable shaft extends. In one example, the rotatable shaft is an engine shaft and the casing defines a bearing compartment. In one example, the engine shaft is a drive shaft for a turbine engine applicable for aircraft. The sealing arrangement can include a composite seal ring that includes a seal ring shell and a seal insert. The seal ring shell surrounds a central axis and may extend along the central axis from a first end to an opposite second end. The seal insert can be mounted at the first end of the seal ring shell. The seal insert can have a sealing face that faces axially outwardly from the seal ring shell. The sealing face can be adapted to form a dynamic seal with respect to a mating ring that rotates with the rotatable shaft. The seal ring shell can include an outer radial flange located at an intermediate position between the first and second ends of the seal ring shell. The seal ring shell can include a piston portion that extends axially between the flange and the second end of the seal ring shell. The sealing arrangement can include an outer housing that telescopically receives the piston portion of the seal ring shell such that relative axial sliding movement along the central axis is permitted between the outer housing and the sealing ring shell. The outer housing can include an outer form factor adapted to be received within the casing of the bearing compartment. The sealing arrangement can include at least one spring axially compressed between the outer radial flange of the seal ring shell and the outer housing. The at least one spring can be utilized for generating a spring force that biases the seal ring shell and the outer housing axially away from each other. The sealing arrangement can further include a welded bellows that surrounds the central axis. The welded bellows can be positioned within the outer housing. The welded bellows can be axially compressed between an end wall defined by the piston portion of the sealing ring shell at the second end of the sealing ring shell and an end wall defined by the outer housing. The welded bellows have a fixed end and an opposite free end. The fixed end can be welded to one of the end walls, and the free end can make a non-welded static contact seal with the other one of the end walls.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like parts.

The present disclosure relates to a sealing arrangement including two types of sealing that can be characterized as a primary sealing and a secondary sealing. The primary sealing can include dynamic axial face sealing provided between a sealing ring and a mating ring. The secondary sealing can include a welded bellows that provides static sealing capable of accommodating axial movement. In a preferred example, the welded bellows has a fixed end and a free end. In one example, the fixed end can be welded in place with respect to a first structure of the sealing arrangement with a weldment providing sealing about a perimeter of the fixed end with respect to the first structure. The free end can be adapted to make a perimeter contact seal with an opposing second structure of the sealing arrangement. Since only one end of the bellows is fixed and the free end provides freedom of movement that is not possible with a fixed end, the bellows is at least partially isolated from vibration and unusual motion that would normally be absorbed by the bellows in the case where both ends are fixed. Such isolation can reduce stress on the bellows. In certain examples, a biasing arrangement including at least one spring (e.g., a coil spring or multiple coil springs, a wave spring, a cone spring, etc.) can be used to apply axial seal loading on the primary sealing. The biasing arrangement can reduce the role of the bellows in maintaining axial loading of the primary sealing thereby further reducing stress on the bellows. In a preferred example, the primary and secondary seals can be adapted use in high temperature applications (e.g. for applications which exceed 700 degrees Fahrenheit).

FIGS. 1-4 depict an example sealing arrangement 10 in accordance with the principles of the present disclosure. At FIG. 4, the sealing arrangement 10 is depicted providing sealing with respect to a rotating shaft that passes through a housing. In certain examples, the shaft can include an engine shaft such as a drive shaft of a gas turbine engine, and the housing can include a casing of a bearing compartment that contains lubricating oil for maintaining lubrication of the bearings that rotationally support the shaft. Of course, the aspects of the present disclosure are applicable to any rotational sealing applications. In certain examples, aspects of the present disclosure are applicable to high temperature sealing applications such as turbine engines for aircraft.

Figure 1:
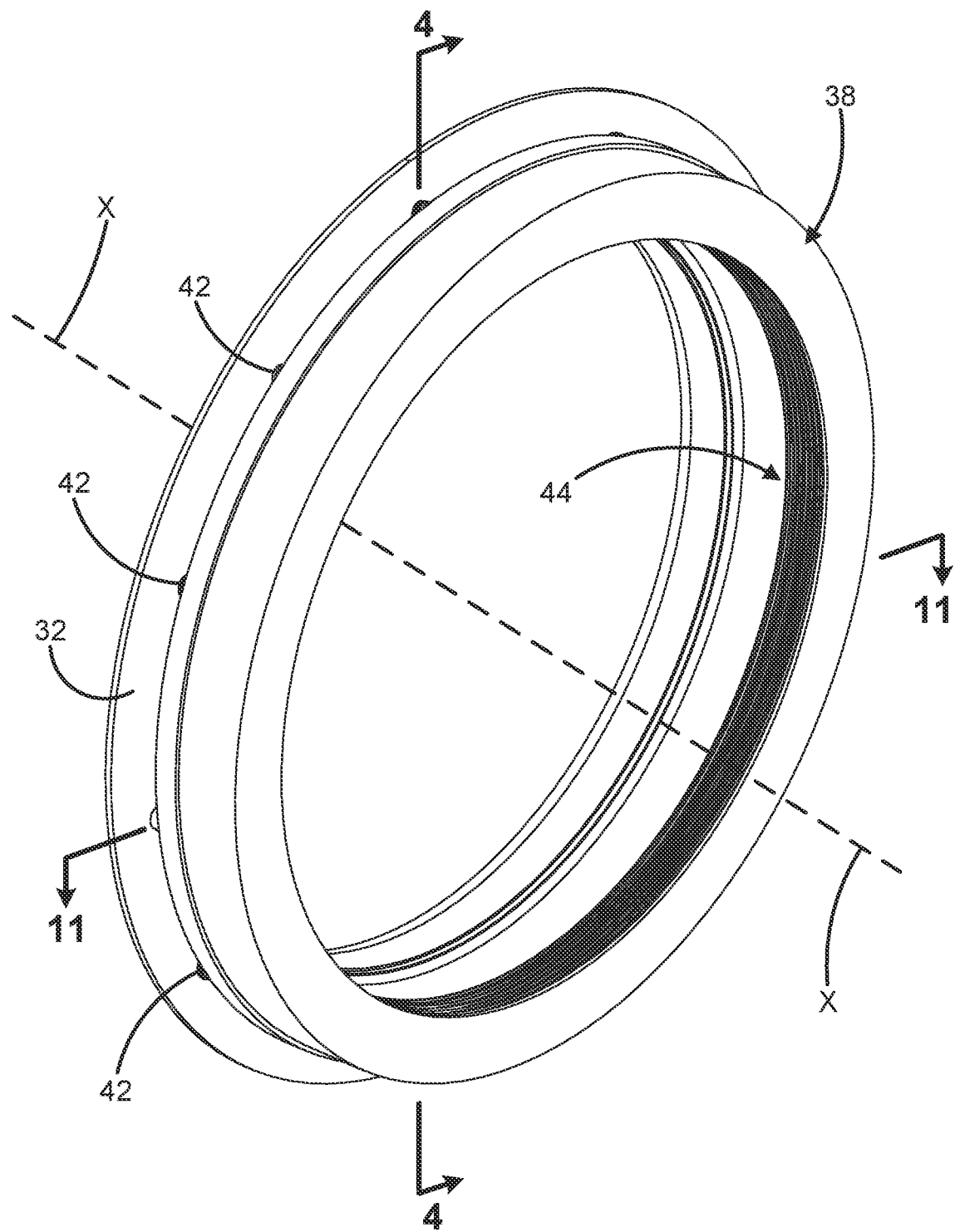
FIG. 1 illustrates a perspective view of an example sealing arrangement in accordance with principles of the present disclosure.
Figure 2:
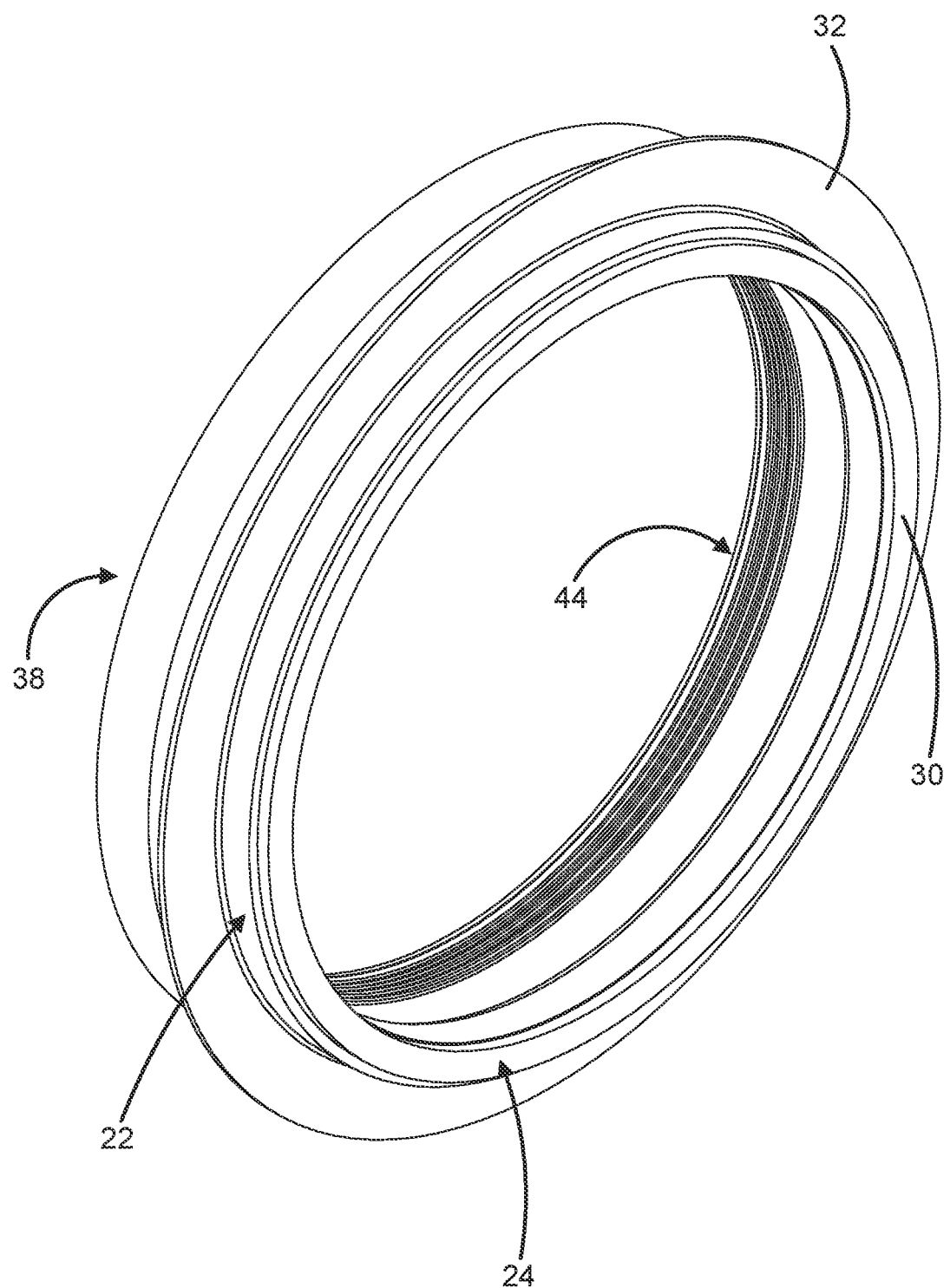
FIG. 2 illustrates another perspective view of the sealing arrangement of FIG. 1.
Figure 3:
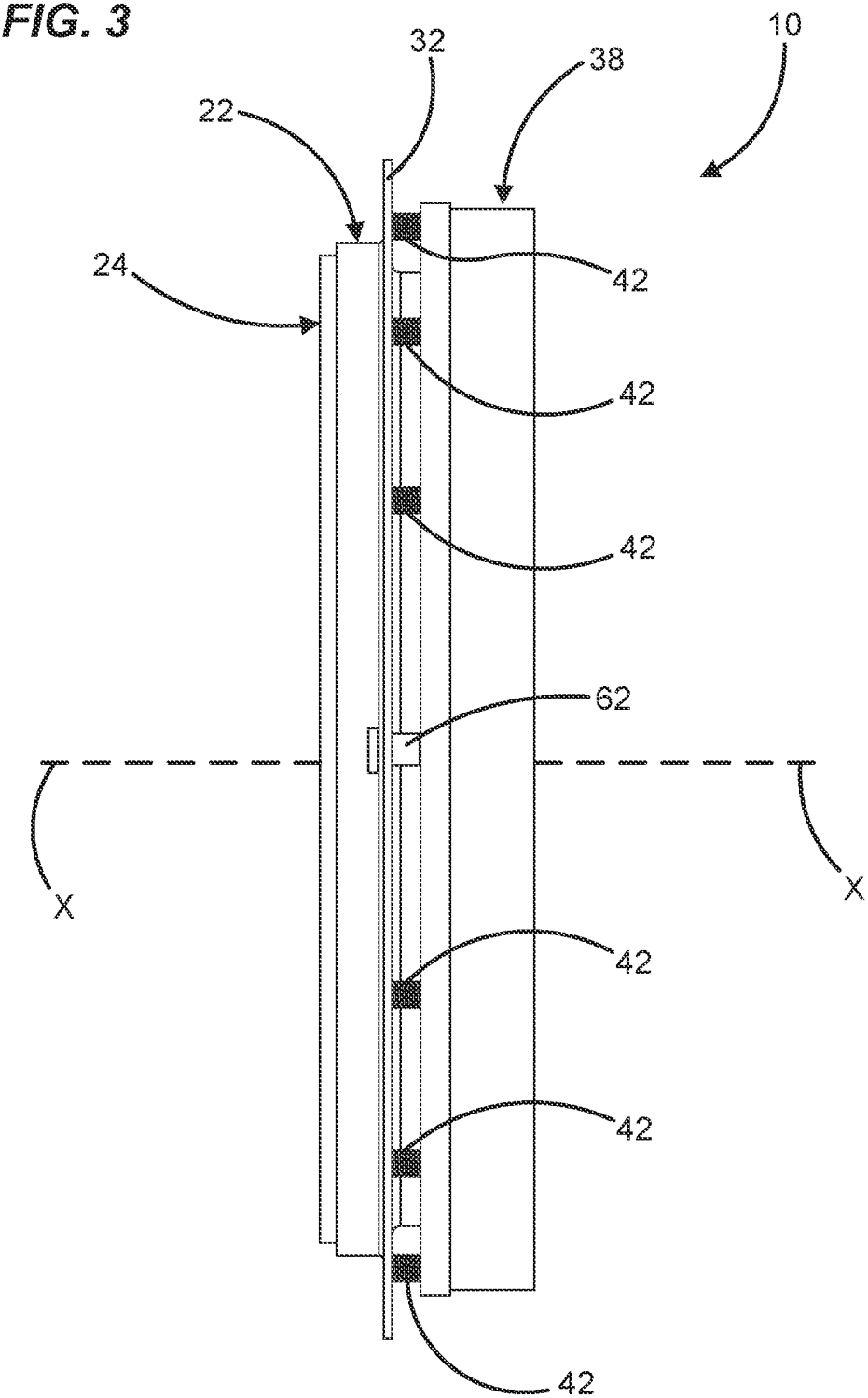
FIG. 3 is a side view of the sealing arrangement of FIG. 1.
Figure 4:
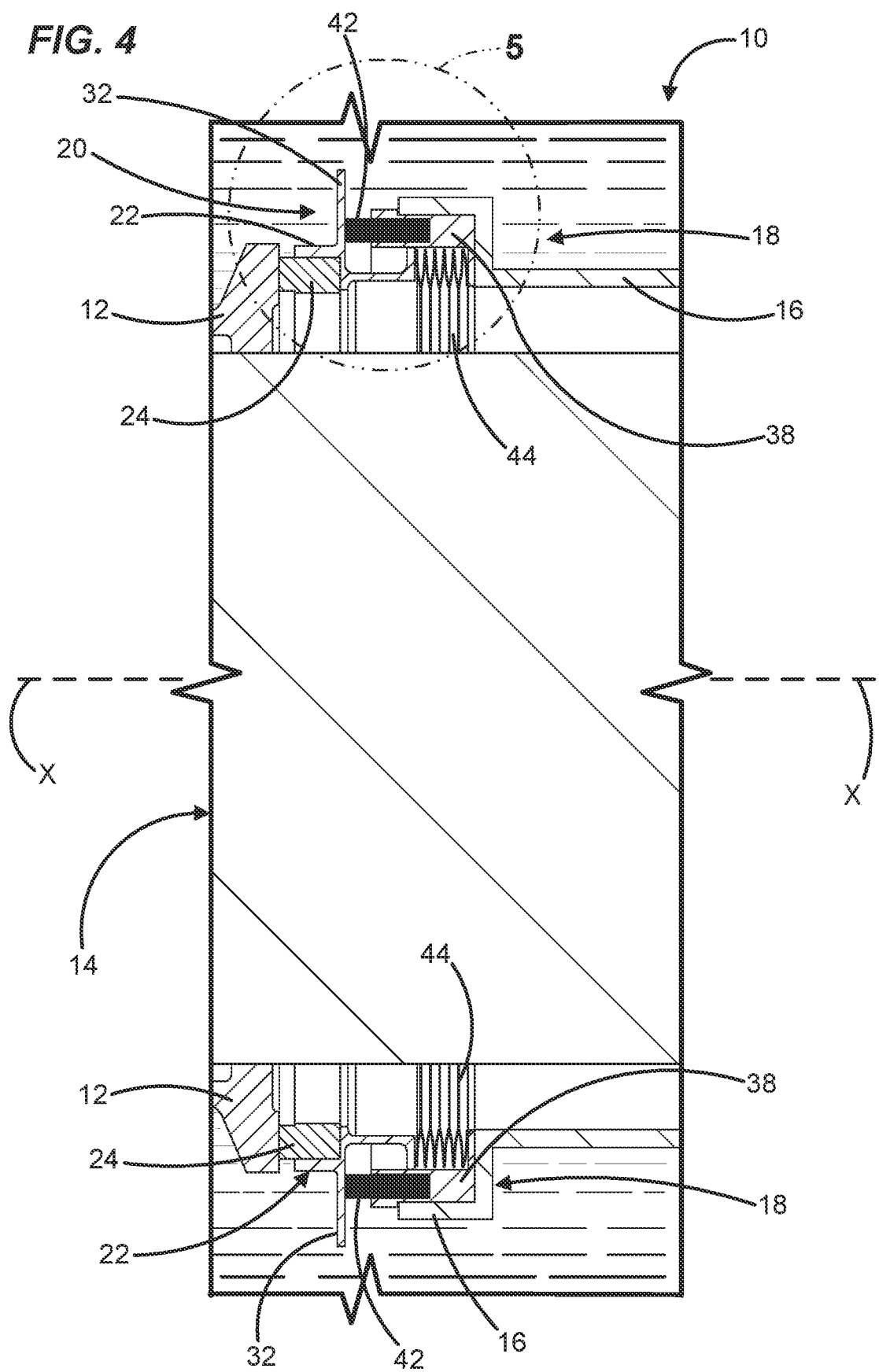
FIG. 4 is a cross-sectional view taken along line 4-4 of FIG. 1.

As depicted in FIG. 4, the sealing arrangement 10 is shown providing sealing between a rotatable shaft 14 and a housing 16. The housing 16 can include a casing defining a bearing compartment 18 of an engine such as a turbine engine. The compartment 18 can contain a mixture of oil and air. The sealing arrangement 10 can assist in containing the oil in the bearing compartment 18. The shaft 14 can be the shaft of an engine such as a turbine engine.

Figure 5:
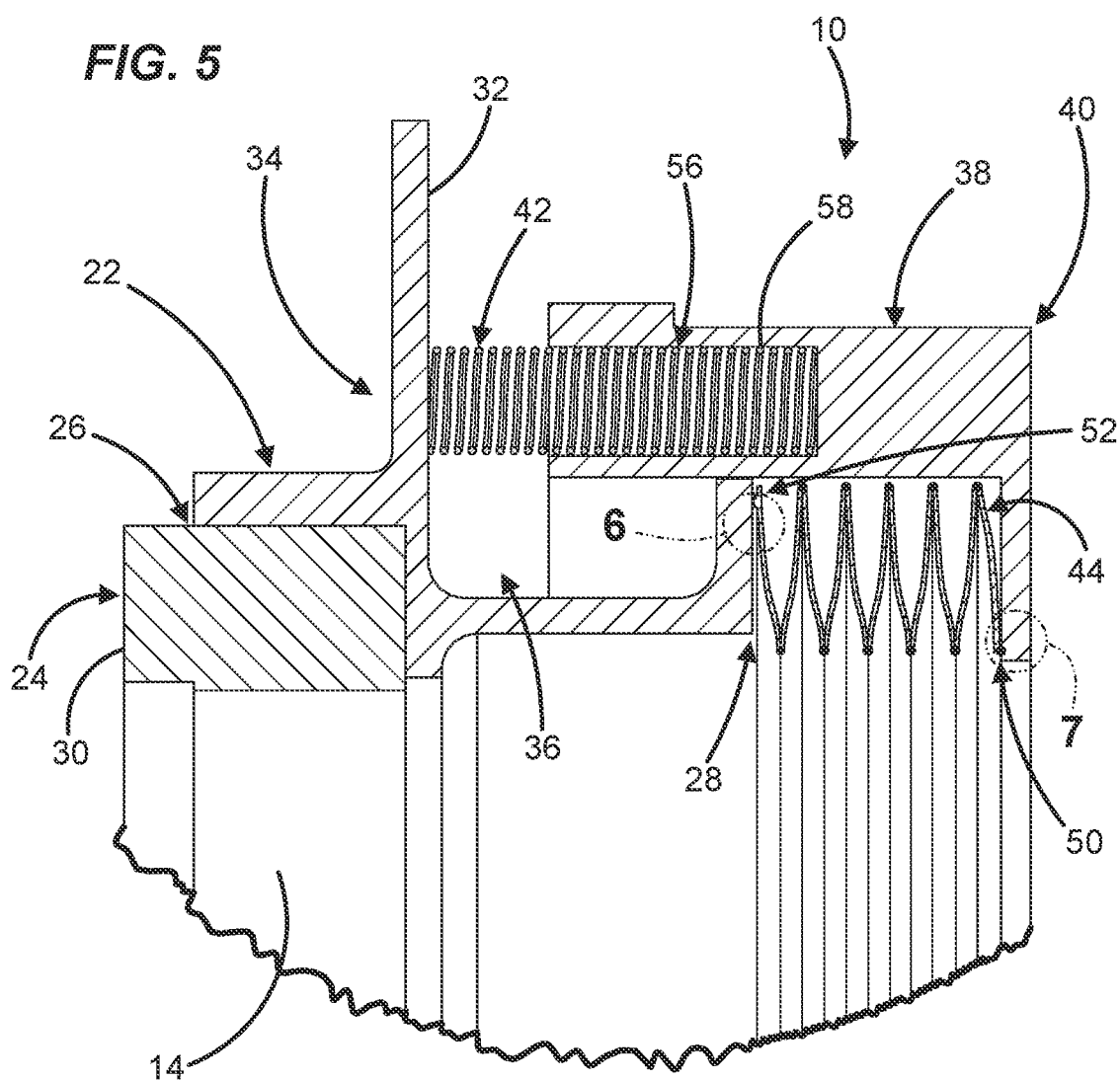
FIG. 5 is an enlarged view of a portion of the sealing arrangement of FIG. 4.

Referring to FIGS. 4 and 5, the sealing arrangement 10 includes a mating ring 12 secured on the shaft 14 such that the mating ring 12 rotates in unison with the shaft 14. The sealing arrangement 10 also includes a composite seal ring 20 that includes a seal ring shell 22 and a seal insert 24. The seal ring shell 22 surrounds a central axis X and extends along the central axis X from a first end 26 to an opposite second end 28. The seal ring shell 22 can be comprised of a metallic material such as, but not limited to, copper, titanium, stainless steel, or high nickel alloy, although alternatives are possible. In certain examples, the seal insert 24 may be comprised of composite materials that include carbon, such as graphite. In other examples, the seal insert 24 can have a composition that includes ceramic materials. Of course, other material can be used as well for the seal insert.

Referring still to FIGS. 4 and 5, the seal insert 24 is shown mounted at the first end 26 of the seal ring shell 22. In one example, the seal insert 24 is press fit within the first end 26 of the seal ring shell 22. The seal insert 24 has a sealing face 30 that faces axially outwardly from the seal ring shell 22. The sealing face 30 of the seal insert 24 is adapted to form a dynamic seal with respect to an opposing annular sealing surface of the mating ring 12. That is, the seal insert 24 can provide a primary axial seal. The shaft 14 extends through a center of the seal insert 24. The seal insert 24 is a non-rotating seal (e.g., the seal insert 24 does not rotate with the shaft 14, but instead stays rotationally stationary along with the housing 16).

In certain examples, the seal ring shell 22 includes an outer radial flange 32 located at an intermediate position 34 between the first and second ends 26, 28 of the seal ring shell 22. The seal ring shell 22 also includes a piston portion 36 that extends axially between the outer radial flange 32 and the second end 28 of the seal ring shell 22.

The sealing arrangement 10 also includes an outer housing 38 positioned at the second end 28 of the seal ring shell 22. The outer housing 38 includes a cylinder portion adapted to telescopically receive the piston portion 36 of the seal ring shell 22 such that relative axial sliding movement along the central axis X is permitted between the outer housing 38 and the seal ring shell 22. That is, the seal ring shell 22 and the outer housing 38 can be telescopically movable with respect to each other along the central axis X. In certain examples, the outer housing 38 may be constructed of a material having a composition that includes metallic and/or non-metallic materials.

The outer housing 38 can include an outer form factor 40 adapted to be received within an opening 17 defined by the housing 16. The opening 17 of the housing surrounds and is concentric with the shaft 14. In certain examples, the outer housing 38 may be press fit within the opening 17 of the housing 16, and the opening 17 can define a pocket for receiving the outer housing 38.

The sealing arrangement 10 may include at least one spring 42 that may be axially compressed between the outer radial flange 32 of the seal ring shell 22 and the outer housing 38. In the example depicted, the at least one spring 42 includes a plurality of coil springs spaced about a circumference of the seal ring shell 22. Ends 56 of the plurality of coil springs 42 can be received within pockets 58 defined by the outer housing 38. The plurality of coil springs 42 are provided for generating a spring force that biases the seal ring shell 22 and the outer housing 38 axially away from each other. In certain examples, the springs 42 can include coil springs, leaf springs, wave springs, or spring washers, although alternatives are possible.

In certain examples, the springs 42 can be utilized to maintain an axial spring load between the seal insert 24 and the mating ring 12 so that contact between the seal insert 24 and the mating ring 12 is maintained at all times. That is, if the shaft 14 and the mating ring 12 axially move, the springs 42 can push the composite seal ring 20 with the movement of the shaft to maintain the dynamic seal.

The sealing arrangement 10 can further include a welded bellows 44 that surrounds the central axis X to provide the static secondary sealing. In certain examples, the welded bellows may be constructed of a material having a composition that includes metallic materials such as stainless steel, nickel alloys, titanium allows, and/or any weldable alloys.

The welded bellows 44 may be designed to operate in non-oxidizing or oxidizing environments and temperatures in excess of 700° F. In certain examples, the welded bellows 44 can be positioned within the outer housing 38 and can be axially compressed between an end wall 46 defined by the piston portion 36 of the seal ring shell 22 at the second end 28 of the seal ring shell 22 and an end wall 48 defined by the outer housing 38. The welded bellows 44 can also axially expand between the end wall 46 of the piston portion 36 of the seal ring shell 22 and the end wall 48 of the outer housing 38.

The welded bellows 44 can have a fixed end 50 and an opposite free end 52. The welded bellows 44 can be isolated from dynamic stresses by fixing the welded bellows 44 only on one end while allowing for freedom of movement (e.g., radial freedom of movement relative to a central axis of the shaft 14) at the opposite end. For example, one end of the bellows 44 can be fixed by welding the end to the seal ring shell 22, while the opposite end is not welded or otherwise fixed to the outer housing 38. Alternatively, one end of the bellows 44 can be fixed by welding the end to the housing 38, while the opposite end is not welded or otherwise fixed to the shell 22 (see FIG. 5).

Figure 6:
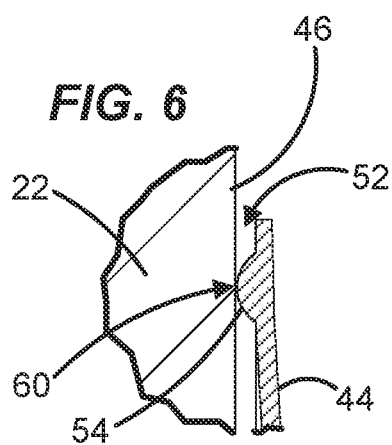
FIG. 6 is an enlarged view of a portion of the sealing arrangement of FIG. 5 showing a non-welded static contact seal in accordance with the principles of the present disclosure.

Turning to FIG. 6, a cross-sectional view of the free end 52 of the welded bellows 44 is depicted. The free end 52 of the welded bellows 44 can include a projecting surface 54 (e.g., hump) that makes a non-welded contact seal 60 with the seal ring shell 22, although alternatives are possible. The projecting surface 54 of the free end 52 of the welded bellows 44 can be free to float and is axially biased against the seal ring shell 22 by the inherent resiliency of the bellows to create an annular metal-to-metal seal with the end wall 46 of the seal ring shell 22.

In certain examples, the free end 52 of the welded bellows 44 allows the contact seal 60 to move radially to provide more degrees of freedom compared to mechanically attaching both ends of the welded bellows 44 by welding.

In certain examples, the welded bellows 44 can provide pre-axial load such that as the composite seal ring 20 moves axially, the non-welded contact seal 60 of the welded bellows 44 can stay in contact with seal ring shell 22. That is, the welded bellows 44 can be adapted to expand to maintain the non-welded contact seal 60 with the seal ring shell 22.

In certain examples, if there is unusual movement in a turbine engine, the non-welded contact seal 60 of the welded bellows 44 can be free to slide to mitigate any additional stresses from the movement.

The springs 42 can provide the necessary force to achieve the axial dynamic seal rather than relying on the welded bellows 44. The springs 42 can provide axial load (i.e., axial load driver) in the sealing arrangement 10 and therefore reduce the axial stress that the welded bellows 44 would have to endure throughout its service life. The combination of the springs 42 and the free end 52 of the welded bellows 44 provided in the sealing arrangement 10 can help to reduce vibration on the welded bellows 44.

Figure 7:
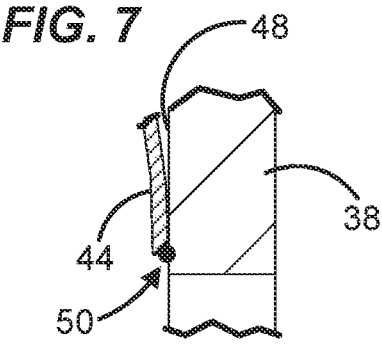
FIG. 7 is an enlarged view of a portion of the sealing arrangement of FIG. 5 showing a welded seal in accordance with the principles of the present disclosure.
Figure 8:
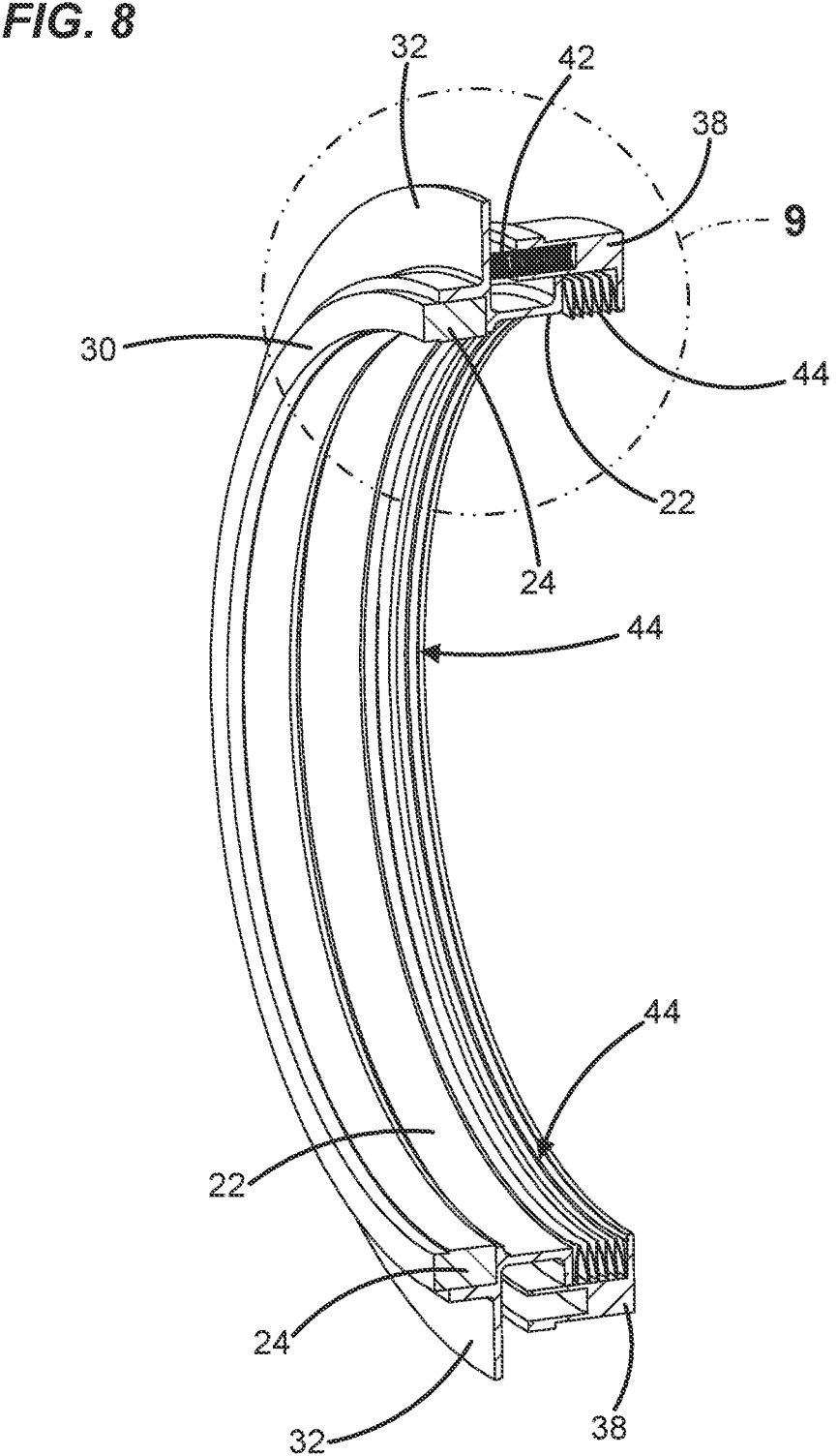
FIG. 8 is a cross-sectional view of the sealing arrangement of FIG. 1.
Figure 9:
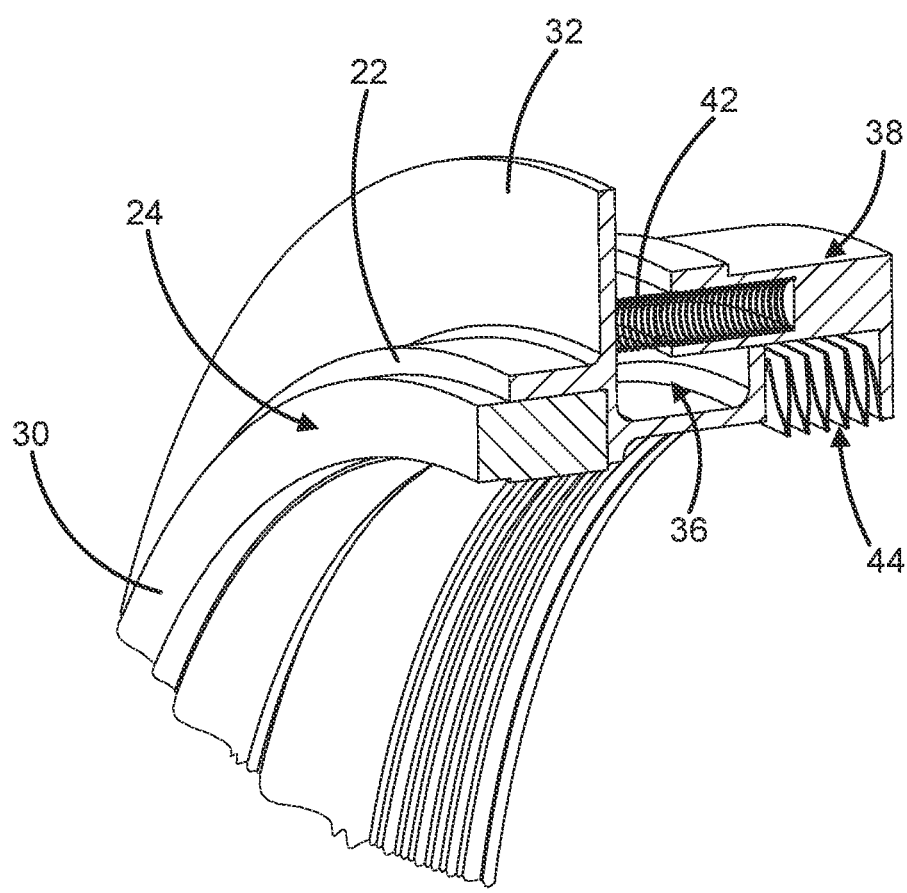
FIG. 9 is an enlarged view of a portion of the sealing arrangement of FIG. 8.

Turning to FIG. 7, a cross-sectional view of the fixed end 50 of the welded bellows 44 is shown welded to the end wall 48 of the outer housing 38, although alternatives are possible. The fixed end 50 of the welded bellows 44 can be welded on the outer diameter or inner diameter of the bellows 44. The seal face mechanical load is primarily provided by the springs 42 to reduce the axial stress on the welded bellows 44. That is, the welded bellows 44 provide reduced spring load while the springs 42 are the axial load drivers for closing the seal with respect to the mating ring 12.

Figure 10:
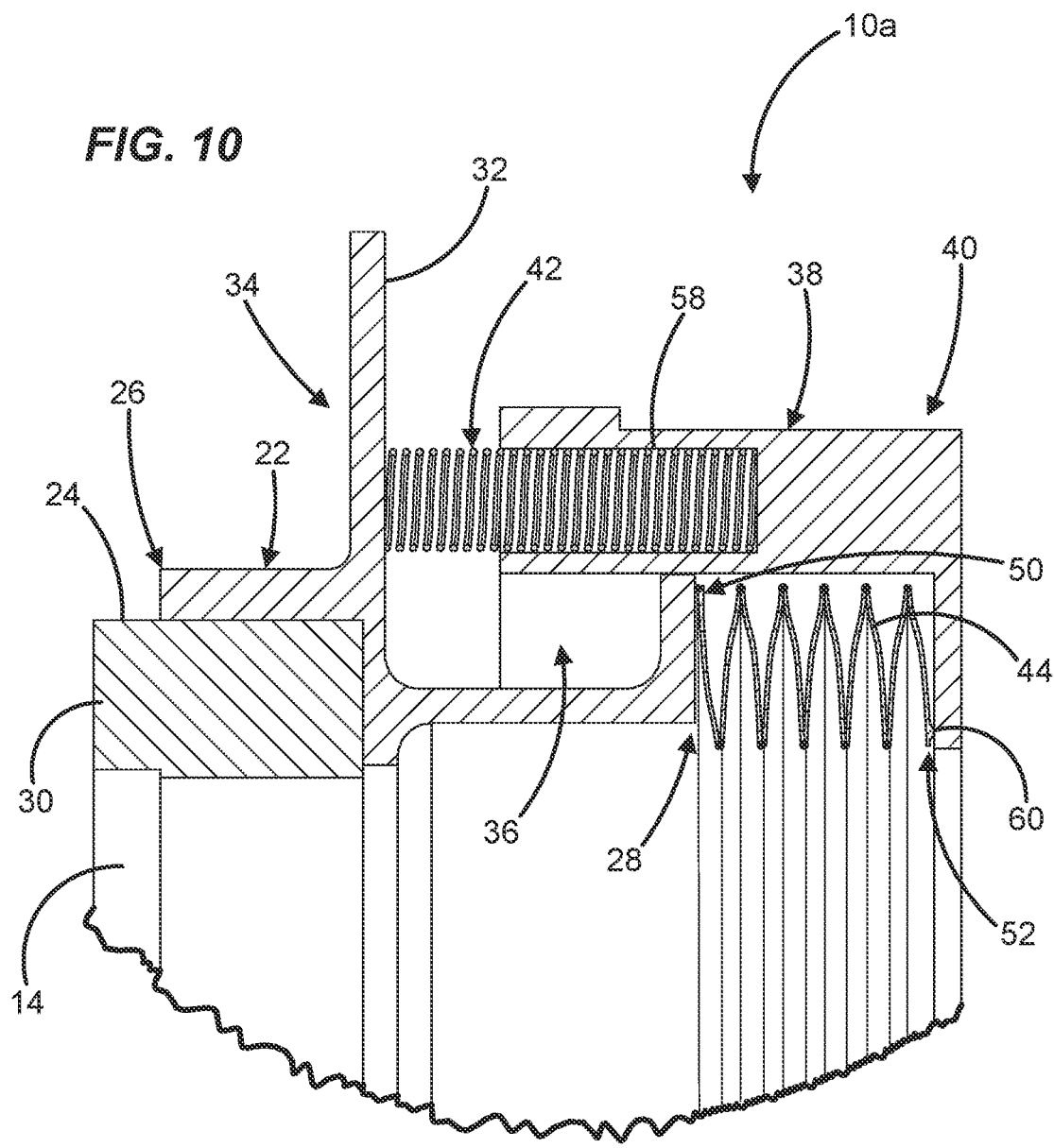
FIG. 10 is a cross-sectional view of an alternative sealing arrangement in accordance with the principles of the present disclosure.

Turning to FIG. 10, an alternative sealing arrangement 10a is depicted. For the sake of brevity, only those portions of the sealing arrangement 10a that differ from the sealing arrangement 10 illustrated in FIGS. 1-9 discussed above will be described in detail. Thus, similar components of the sealing arrangement 10a that correspond to the respective components of the high temperature sealing arrangement 10 will not be explained in detail again.

In the sealing arrangement 10a shown, the fixed end 50 of the welded bellows 44 is welded to the seal ring shell 22 and the free end 52 of the welded bellows 44 makes the non-welded contact seal 60 with the outer housing 38.

Figure 11:
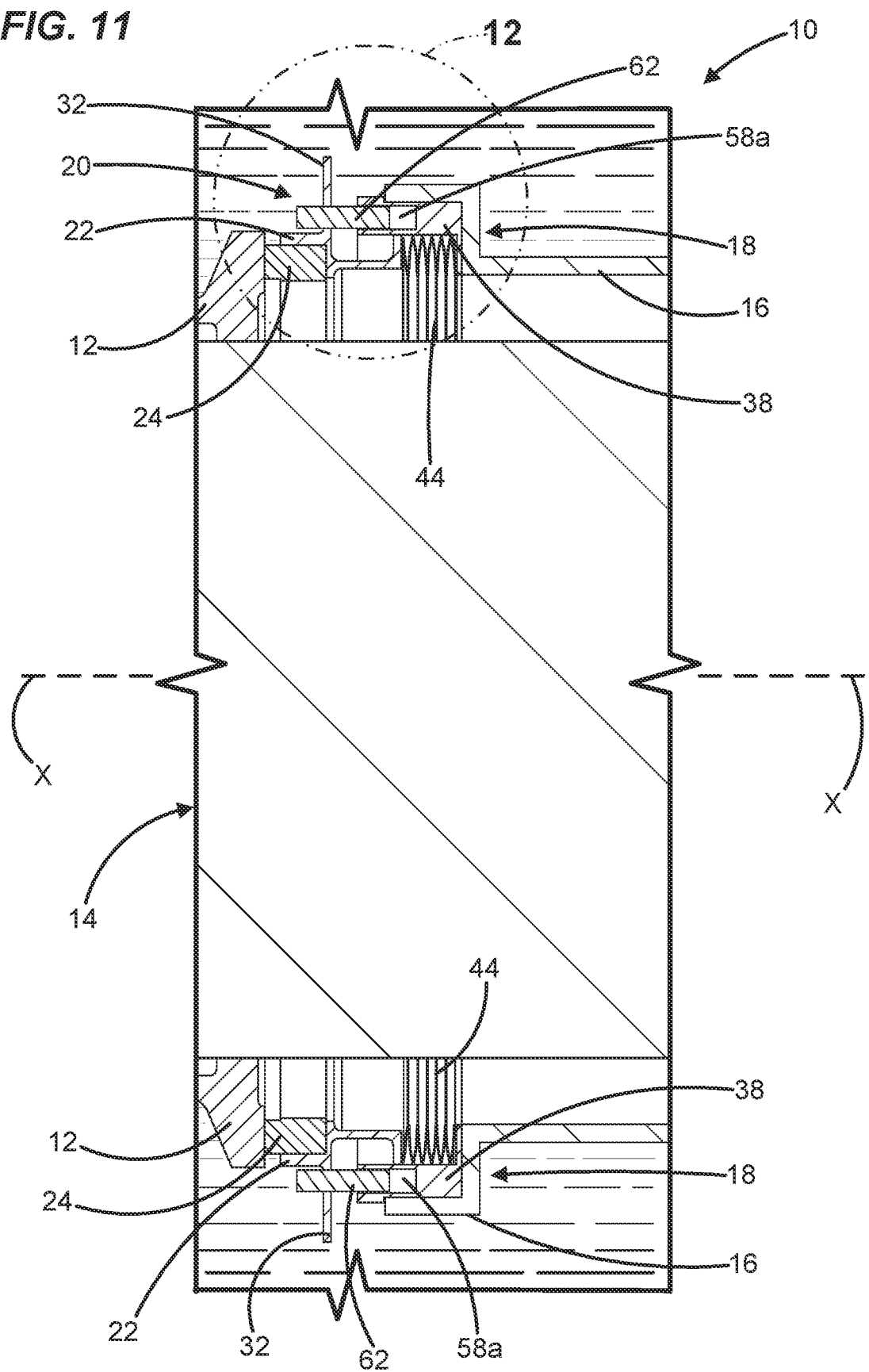
FIG. 11 is a cross-sectional view taken along line 11-11 of FIG. 1 depicting a retention mechanism in accordance with the principles of the present disclosure.
Figure 12:
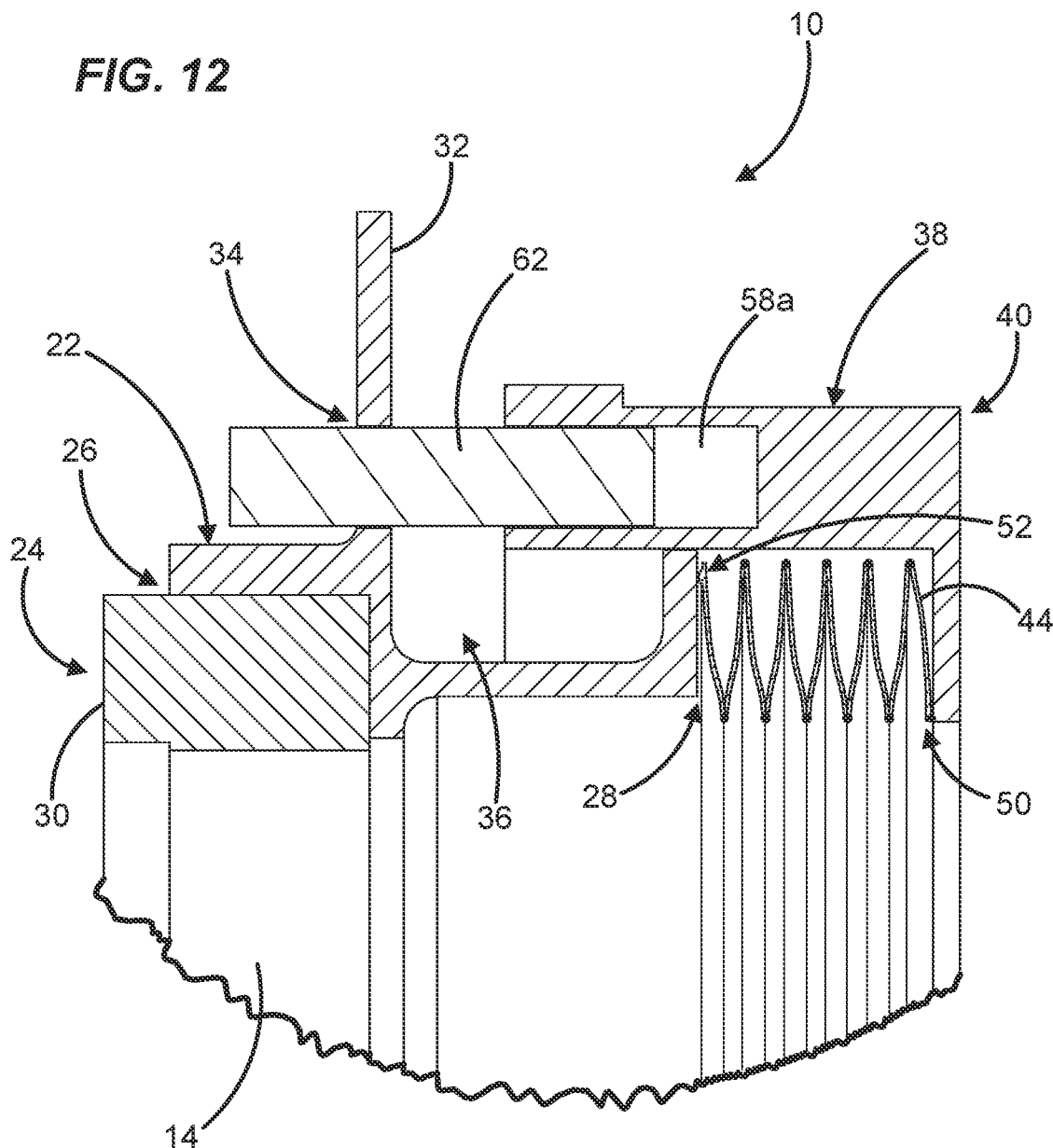
FIG. 12 is an enlarged view of a portion of the sealing arrangement of FIG. 11.

Turning to FIGS. 11 and 12, the sealing arrangements 10, 10a may also include at least one anti-rotation pin 62 positioned between the outer radial flange 32 of the seal ring shell 22 and the outer housing 38. In the example depicted, the sealing arrangement 10 includes at least two anti-rotation pins 62. In other examples, the sealing arrangements 10, 10a may include a plurality of anti-rotation pins 62 spaced about the circumference of the seal ring shell 22 between locations of the springs 42. The anti-rotation pins 62 can be received within pockets 58a (see FIG. 12) defined by the outer housing 38. Because the seal insert 24 does not rotate with the shaft 14, but instead stays rotationally stationary along with the housing 16, undesirable torque reactions may result. The anti-rotation pins 62 can be utilized to help resist such torque reactions by preventing the seal ring shell 22 from rotating relative to the housing 16.

In certain examples, the anti-rotation pins 62 can provide a slidable connection between the seal ring shell 22 and the housing 16. That is, the anti-rotation pins 62 can allow the seal ring shell 22 to slide relative to the housing 16 while also preventing the seal ring shell 22 from rotating relative to the housing 16.

In certain examples, a clip or other mechanical device (not shown) may be utilized to help contain or keep the components of the sealing arrangement 10, 10a assembled together prior to installation. For example, the clip or similar device can be used to secure the sealing arrangement 10, 10a during handling or shipment. In other examples, an adhesive bond may be utilized to hold the components of the sealing arrangements 10, 10a together prior to installation.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A sealing arrangement comprising:
   a composite seal ring including a seal ring shell having a first end and an opposite second end, the composite seal ring also including a seal insert mounted at the first end of the seal ring shell;
   an outer housing positioned at the second end of the seal ring shell;
   the seal ring shell and the outer housing being telescopically movable with respect to each other along a central axis such that relative axial sliding movement is permitted between the seal ring shell and the outer housing;
   at least one spring axially compressed between the seal ring shell and the outer housing for biasing the seal ring shell and the outer housing axially away from one another; and
   a welded bellows axially compressed between the seal ring shell and the outer housing, the welded bellows having a fixed end and an opposite free end, the fixed end being welded to one of the seal ring shell and the outer housing, and the free end making a non-welded contact seal with the other one of the seal ring shell and the outer housing.

2. The sealing arrangement of claim 1, wherein the seal ring shell is metal and the seal insert is press fit, captured and mechanically secured, or bonded within the first end of the seal ring shell.

3. The sealing arrangement of claim 1, wherein the seal insert has a composition that includes carbon.

4. The sealing arrangement of claim 1, wherein the seal insert has a composition that includes graphite.

5. The sealing arrangement of claim 1, wherein the seal insert has a composition that includes ceramic.

6. The sealing arrangement of claim 1, wherein the at least one spring includes at least one coil spring.

7. The sealing arrangement of claim 6, wherein the at least one coil spring includes a plurality of coil springs spaced about a circumference of the seal ring shell.

8. The sealing arrangement of claim 7, wherein the seal ring shell includes an outer radial flange, and wherein the plurality of coil springs are compressed between the outer radial flange and the outer housing.

9. The sealing arrangement of claim 8, wherein ends of the plurality of coil springs are received within pockets defined by the outer housing.

10. The sealing arrangement of claim 1, wherein the seal ring shell and the outer housing are metal, wherein the fixed end of the welded bellows is welded to the seal ring shell, and wherein the free end of the welded bellows makes the non-welded contact seal with the outer housing.

11. The sealing arrangement of claim 1, wherein the seal ring shell and the outer housing are metal, wherein the fixed end of the welded bellows is welded to the outer housing, and wherein the free end of the welded bellows makes the non-welded contact seal with the seal ring shell.

12. A sealing arrangement for sealing between a rotating shaft and a casing through which the rotating shaft extends, the sealing arrangement comprising:
    a mating ring for being carried on the shaft and for rotating therewith;
    a composite seal ring including a seal ring shell and a seal insert, the seal ring shell surrounding a central axis and extending along the central axis from a first end to an opposite second end, the seal insert being mounted at the first end of the seal ring shell, the seal insert having a sealing face that faces axially outwardly from the seal ring shell, the sealing face being adapted to form a dynamic seal with respect to the mating ring, the seal ring shell including an outer radial flange located at an intermediate position between the first and second ends of the seal ring shell, the seal ring shell including a piston portion that extends axially between the outer radial flange and the second end of the seal ring shell;
    an outer housing that telescopically receives the piston portion of the seal ring shell such that relative axial sliding movement along the central axis is permitted between the outer housing and the seal ring shell, the outer housing including an outer form factor adapted to be received within the casing;
    at least one spring axially compressed between the outer radial flange of the seal ring shell and the outer housing for generating a spring force that biases the seal ring shell and the outer housing axially away from each other; and
    a welded bellows that surrounds the central axis, the welded bellows being positioned within the outer housing and being axially compressed between an end wall defined by the piston portion of the seal ring shell at the second end of the seal ring shell and an end wall defined by the outer housing, the welded bellows having a fixed end and an opposite free end, the fixed end being welded to one of the end walls, and the free end making a non-welded static contact seal with the other one of the end walls.

13. The sealing arrangement of claim 12, for use with the casing when the casing contains a mixture of oil and air.

14. A seal arrangement, comprising:
    (a) a housing defining a cavity;
    (b) a composite seal including a seal ring insert and a seal ring shell;
    (c) a biasing arrangement including a first end and a second end, the second end being disposed partially within the cavity of the housing for providing axial mechanical loading, the first end of the biasing arrangement abutting the seal ring shell; and
    (d) a bellows disposed between an end wall of the housing and an end wall of the seal ring shell, the bellows including a free-floating end and an opposite welded end, wherein the welded end of the bellows is welded to one of the end wall of the housing or the end wall of the seal ring shell and the free-floating end of the bellows contacts but is not welded to the other of the end wall of the housing or the end wall of the seal ring shell.

15. The seal arrangement of claim 14, wherein the free-floating end of the bellows forms a non-welded, metal-to-metal seal with the housing or the seal ring shell.

16. The seal arrangement of claim 14, wherein the seal ring insert is adapted to be in press-fit connection with the seal ring shell.

17. The seal arrangement of claim 16, wherein the seal ring insert is comprised of a carbon graphite material.

18. The seal arrangement of claim 14, wherein the seal ring shell is comprised of metal.

19. The seal arrangement of claim 14, wherein the housing is comprised of metal.

20. The seal arrangement of claim 14, wherein the biasing arrangement is a coil spring.

21. The seal arrangement of claim 14, wherein the seal ring shell includes an outer radial flange, and wherein the biasing arrangement is compressed between the outer radial flange and the housing.

\* \* \* \* \*